AIR CONDITIONING SYSTEMS WITH REHEAT COILS
Original Filed Nov. 30, 1966
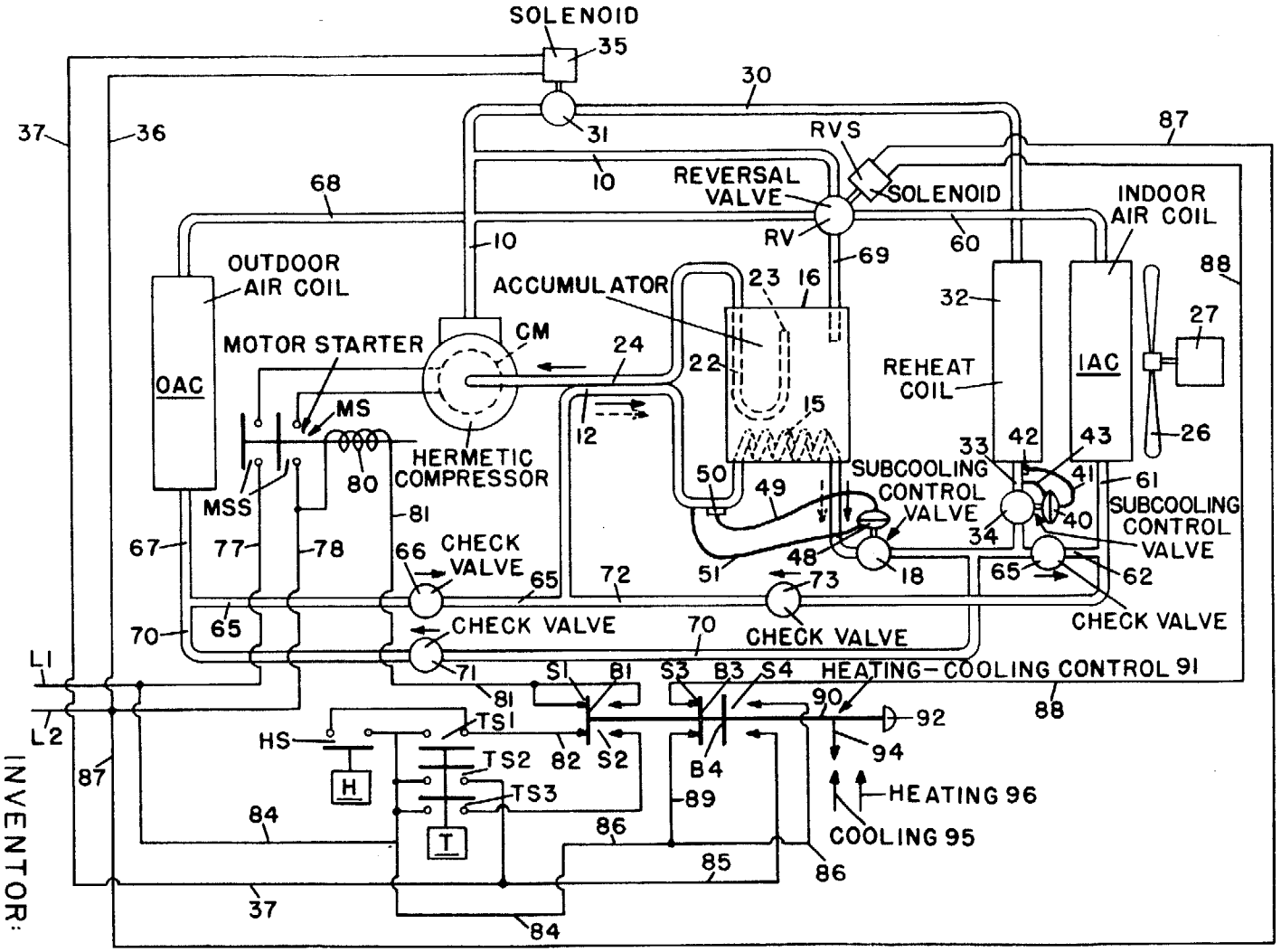
INVENTOR:
ERIK H. JENSEN,
BY Robert J. Palmer
ATTORNEY United States Patent Office Re. 26,695
Reissued Oct. 14, 1969

26,695
AIR CONDITIONING SYSTEMS WITH REHEAT COILS

Erik H. Jensen, Staunton, Va., assignor to Westinghouse Electric Corporation, Pittsburgh, Pa., a corporation of Pennsylvania Original No. 3,362,184, dated Jan. 9, 1968, Ser. No. 598,078, Nov. 30, 1966. Application for reissue May 29, 1968, Ser. No. 742,812
Int. Cl. F25b *29/00, 41/04*
U.S. Cl. 62—173 4 Claims

Matter enclosed in heavy brackets [ ] appears in the original patent but forms no part of this reissue specification; matter printed in italics indicates the additions made by reissue.

This invention relates to air conditioning systems in which air is chilled, for dehumidificaton, to low temperatures, and then is reheated for increasing its temperature to a comfortable temperature.

In many locations, the wet bulb temperature of the outdoor air is so high that where the utmost of comfort is desired, it is necessary to chill air to be cooled in summer below its dew point temperature, and then to reheat the dehumidified air to a comfortable temperature. The copending application of Rodney F. Lauer, Ser. No. 519,901, filed Jan. 11, 1966, discloses a system in which this is accomplished by operating, when reheat is required, a reheat coil as an auxiliary condenser coil connected, in effect, in parallel with a main condenser coil. The reheat coil is connected to the inlet of the opening evaporator coil through a capillary tube operating as an expansion means. In such a system, under certain operating conditions, it has been found that sufficient gas will pass through the capillary tube to prevent proper operation of the main condenser coil, and to increase the temperature of the evaporator coil, preventing the desired dehumidification. I have found that by substituting a sub-cooling control valve for the capillary tube of the Lauer system, the effectiveness of the system is greatly increased.

An object of this invention is to improve air conditioning systems in which reheat coils are operated as auxiliary condenser coils.

This invention will now be described with reference to the annexed drawing which is a diagrammatic view of a heat pump embodying this invention.

Compressor motor CM drives refrigerant compressor C. The latter is connected by tube 10 to a conventional reversal valve RV, adjustable by a solenoid RVS. The valve RV is connected by tube 60 to one end of indoor air coil IAC, the other end of which is connected by tube 61, tube 62 containing a check-valve 65, and subcooling control valve 18 to the outlet of coil 15 within accumulator 16. The valve 18 has a diaphragm chamber 48, the upper portion of which is connected by capillary tube 49 to thermal bulb 50 in heat exchange contact with tube 12, and the lower portion of which is connected by capillary tube 51 to the interior of the tube 12.

The inlet of the coil 15 is connected by the tube 12, tube 65 containing a check-valve 66, and tube 67 to one end of outdoor air coil OAC, the other end of which is connected by tube 68 to the valve RV. The valve RV is connected by tube 69 to the upper portion of the accumulator 16. The accumulator 16 contains a U-shaped tube 22 having an open end 23, with its other end connected by suction gas tube 24 to the suction side of the compressor C. Portions of the tubes 12 and 24 are in heat exchange contact.

A tube 30 containing a valve 31 adjustable by a solenoid 35, is connected to the tube 10, and to one end of reheat coil 32, the other end of which is connected by tube 33 containing a subcooling control valve 34 to the tube 62 between the valve 18 and the check-valve 63. The subcooling control valve 34 has a diaphragm chamber 40, the outer portion of which is connected by a capillary tube 41 to thermal bulb 42 in heat exchange contact with the tube 33, and the inner portion of which is connected by capillary tube 43 to the interior of the tube 33. The tube 65 is connected by tube 72 containing a check-valve 73, to the tube 61. The reheat coil 32 is located adjacent to and downstream with respect to air flow, of the indoor air coil IAC. A fan 26 driven by an electric motor 27, moves indoor air over the coils IAC and 32. A fan which is not shown, could be used to move outdoor air over the coil OAC.

The subcooling control valve 18 responds through the capillary tube 49 and the thermal bulb 50 to the temperature of, and through the capillary tube 51 to the pressure of, the refrigerant liquid condensed within the coil OAC or the coil IAC. The subcooling control valve 34 responds through the capillary tube 41 and the thermal bulb 42 to the temperature of, and through the capillary tube 43 to the pressure of the refrigerant liquid condensed within the reheat coil 32. Both valves meter refrigerant to the operating evaporator coil IAC or OAC at the rate at which it is condensed, while maintaining a predetermined amount of subcooling of the condensed liquid by backing up more liquid when more subcooling is required, and backing up less liquid when less subcooling is required, as disclosed in the Patent No. 3,264,837 of James R. Harnish.

The compressor motor CM is connected by wires 77 and 78, and switches MSS of motor starter MS to electric supply lines L1 and L2 respectively. The starter MS has an energizing winding 80 connected by the wire 78 to the line L2, and connected by wire 81 to switches S1 and S2. The switch S1 is also connected by wire 82 to switch TS1 of indoor thermostat T which is connected across switch HS of indoor humidistat H. The switches TS1 and HS are connected in parallel with each other, and in series with the switch S1 and the winding 80 of the motor starter MS to the lines L1 and L2. The solenoid 35 is connected by wire 36 to the line L2, and by wire 37 to switch TS2 of the thermostat T, which switch is connected by the wire 84 to the line L1. Switch S4 is connected by wire 85 to the wire 37, and by wire 86 and the wire 84 to the line L1. The reversal valve solenoid RVS is connected by wire 87 to the line L2, and by wire 88 to switch S3 which is connected by wire 89 and the wires 86 and 84 to the line L1. Switch TS3 of the thermostat T is connected to the wire 84 and to the switch S2.

The switch S1 is closed by switch blade B1 attached to insulator rod 90 of Cooling-Heating Control 91, when control knob 92 on the right end of the rod 90 is adjusted to place the control 91 in cooling position as shown by the drawing. The switch S2 is on the opposite side of the blade B1 from the switch S1, and is adapted to be closed by the blade B1 when the control knob 92 is moved to the right of the position shown by the drawing, to adjust the control 91 to heating position. The switch S3 is closed by switch blade B3 attached to the rod 90, when the control 91 is in its cooling position. The switch S4 is adapted to be closed by switch blade B4 attached to the rod 90, when the control 91 is in its heating position. An indicator arrow 94 on the rod 90 is opposite a fixed indicator arrow 95 when the control 91 is in cooling position, and is opposite a fixed indicator arrow 96 when the control 91 is in its heating position.

The reversal valve RV is of the type which, when its solenoid RVS is deenergized, is in its heating position, and when its solenoid is energized, is in its cooling position.

Cooling operation

When indoor air cooling is desired, the control 91 is placed in its cooling position shown by the drawing. The switches S1 and S3 are closed, and the switches S2 and S4 are open. The switch S1 connects the thermostat switch TS1 and the humidistat switch HS to control the compressor motor starter MS. The switch S3 energizes the reversal valve solenoid RVS which adjusts the valve RV to its cooling position. The starter MS is energized by the closing of the switch HS when the relatively humidity of the indoor air is too high, or by the closing of the thermostat switch TS1 when the indoor temperature is too high, and starts the compressor motor CM. Discharge gas from the compressor C flows through the tube 10, the reversal valve RV, and the tube 68 into the outdoor coil OAC to operate the latter as a condenser coil. Refrigerant liquid flows from the coil OAC through the tube 67, the tube 65, the check-valve 66, the tube 12, the coil 15, the subcooling control valve 18, the tube 62, the check-valve 63 and the tube 61 into the indoor coil IAC operating as an evaportor coil, overfeeding the coil IAC. Gas and unevaporated refrigerant liquid flow from the coil IAC through the tube 60, the reversal valve RV and the tube 69 into the accumulator 16. Heat from the high pressure liquid flowing through the coil 15 evaporates the excess liquid flowing into the accumulator 16. Gas separated from the liquid within the accumulator 16 flows through the tube 22 and the suction gas tube 24 to the suction side of the compressor C.

When reheat is required, the thermostat switch TS2 closes and energizes the solenoid 35 which opens the valve 31, supplying discharge gas from the compressor C through the tubes 10 and 30 into the reheat coil 32, operating the latter as a condenser coil for heating the air blown by the fan 26 over the indoor air coil IAC. Refrigerant condensed within the coil 32 is expanded through the subcooling control valve 34, and flows through the tube 62 and the check-valve 63 into the indoor air coil IAC which is operating as an evaporator coil, overfeeding, together with the refrigerant supplied through the subcooling control valve 18, the indoor air coil IAC. Gas and unevaporated refrigerant liquid flow from the coil IAC into the accumulator 16. Gas separated from the liquid within the accumulator 16 flows to the suction side of the compressor as described in the foregoing.

This invention could be embodied in a non-reversible system which would operate as described in the foregoing in connection with cooling operation except that the check-valves and the reversal valve would not be used.

Heating operation

When indoor air heating is required, the control 91 is placed in its heating position by moving the control knob 92 to the right so that the indicator arrow 94 lines up with the indicator arrow 96. The switches S1 and S3 are opened, and the switches S2 and S4 are closed. The now open switch S1 disconnects the thermostat switch TS1 and the humidistat switch HS from control of the motor starter MS. The open switch S3 deenergizes the reversal valve solenoid RVS which adjusts the reversal valve RV to its heating position. The closed switch S2 connects the thermostat switch TS3 to control the starter MS. The closed switch S4 energizes the solenoid 35 which opens the valve 31 so that discharge gas is supplied into the coil 32 to operate it as a condenser coil during all of the heating operation.

When the thermostat T calls for heat, its switch TS3 closes and energizes the motor starter MS which closes its switches MSS, starting the compressor motor CM. Discharge gas from the compressor C flows through the tube 10, the reversal RV, and the tube 60 into the indoor air coil IAC operating as a condenser coil. Refrigerant liquid condensed within the coil IAC flows through the tubes 61 and 72, the check-valve 73, the tube 12, the coil 15 within the accumulator 16, the tube 62, the subcooling control valve 18, the tube 70, the check-valve 71 and the tube 67 into the outdoor air coil OAC operating as an evaporator coil, overfeeding the latter. Discharge gas also flows from the tube 10 through the tube 30 and the valve 31 into the reheat coil 32 operating as a condenser coil. Refrigerant liquid condensed within the coil 32 is expanded within the subcooling control valve 34, and flows through the tube 70, the check-valve 71 and the tube 67 into the outdoor coil OAC operating as an evaporator, aiding in overfeeding the coil OAC. Gas and unevaporated refrigerant liquid flow from the coil OAC through the tube 88, the reversal valve RV and the tube 69 into the accumulator 16. The coil 15 evaporates the excess refrigerant liquid flowing from the coil OAC into the accumulator 16. Gas separated from the liquid within the accumulator 16 flows through the tubes 22 and 24 to the suction side of the compressor C.

The reheat coil 32 operating as a condenser coil, adds its heat to that provided by the indoor air coil IAC operating as a condenser coil, facilitating the heating of the indoor air.

While the subcooling control valves 18 and 34 have been provided with external equalizer tubes 51 and 43 respectively, they could be internally equalized. In the case of the subcooling control valve 18, the pressure drop through the tube 15 is insignificant.

Since the subcooling control valve 34 maintains subcooling of the liquid condensed within the coil 32 by backing up liquid within the latter, gas cannot blow through the valve 34 as it can through a capillary tube expansion means.

What is claimed is:

1. In an air cooling system including a refrigerant compressor; a condenser coil; an evaporator coil; means connecting the discharge side of said compressor to said condenser coil; accumulator means; [a heat exchange coil arranged to heat liquid within said accumulator means;] a suction gas tube connecting said accumulator means to the suction side of said compressor; [a liquid tube connecting said condenser coil to said heat exchange coil;] an expansion valve; *means including a liquid tube connecting said condenser coil to said valve;* [a third tube connecting said heat exchange coil to said valve;] *means including* a [fourth] *third* tube connecting said valve to said evaporator coil; *means including* a [fifth] *fourth* tube connecting said evaporator coil to said accumulator means; means for passing air to be cooled over said evaporator coil; a reheat coil adjacent to and downstream with respect to air flow of said evaporator coil; means including a normally closed valve connecting said reheat coil to said discharge side of said compressor; means for opening said normally closed valve when reheat is required and for reclosing said normally closed valve when no reheat is required; [and] means for adjusting said expansion valve to supply refrigerant from said [heat exchange] *condenser* coil to said evaporator coil at the rate at which the refrigerant is condensed within said condenser coil; *and means for evaporating refrigerant liquid flowing from said evaporator coil with heat from the high pressure liquid flowing through said liquid tube;* the improvement comprising the provision of means including a subcooling control valve connecting said reheat coil to said [fourth] *third* tube, said subcooling control valve having means including means responsive to the temperature and the pressure of the refrigerant condensed within said reheat coil for adjusting said subcooling control valve.

2. The invention claimed in claim 1 in which said expansion valve is a subcooling control valve having means including means responsive to the temperature and the pressure of the refrigerant condensed within said condenser coil for adjusting said last mentioned subcooling control valve.

3. In a heat pump including a refrigerant compressor; refrigerant reversal means; an outdoor coil; an indoor coil; accumulator means; [a heat exchange coil arranged to heat liquid within said accumulator means;] a discharge gas tube connecting said compressor to said reversal means; a suction gas tube connecting said compressor to said accumulator means; a third tube connecting said reversal means to said accumulator means; a fourth tube connecting said reversal means to said outdoor coil; [a fifth tube containing first check valve means connecting said outdoor coil to said heat exchange coil; a sixth tube connecting said expansion valve to said heat exchange coil;] *means including a fifth tube containing first check valve means connecting said outdoor coil to said expansion valve;* a [seventh] *sixth* tube containing second check valve means connecting said expansion valve to said indoor coil; [an eighth] *a seventh* tube connecting said indoor coil to said reversal means; means for moving air over said indoor coil; a reheat coil adjacent to and downstream of said indoor coil with respect to air flow; [a ninth] *an eighth* tube containing a normally closed valve connecting said discharge gas tube to said reheat coil; a [tenth] *ninth* tube containing third check valve means connecting said [seventh] *sixth* tube between said expansion valve and said second check valve means to said fifth tube between said first check valve means and said outdoor coil; [an eleventh] *a tenth* tube containing fourth check valve connecting said [seventh] *sixth* tube between said second check valve means and said indoor coil to said fifth tube between said first check valve means and said [heat exchange coil] *expansion valve*; means for adjusting said reversal means to cooling position for routing discharge gas from said discharge gas tube through said fourth tube into said outdoor coil to operate the latter as a condenser; means for opening said normally closed valve when reheat is required while said reversal means is in cooling position, for routing discharge gas from said discharge gas tube through said [ninth] *eighth* tube into said reheat coil to operate the latter as a condenser, and for reclosing said normally closed valve when no reheat is required; means for concurrently opening said normally closed valve and adjusting said reversal means to heating position for routing discharge gas from said discharge gas tube through said [eighth] *seventh* tube into said indoor coil and through said [ninth] *eighth* tube into said reheat coil for operating said indoor and reheat coils as condensers; [and] means for adjusting said expansion valve to supply refrigerant to said indoor coil while said outdoor coil is operating as a condenser at the rate at which refrigerant is condensed in said outdoor coil, and to supply refrigerant to said outdoor coil when said indoor coil is operating as a condenser at the rate at which refrigerant is condensed in said indoor coil; *and means for evaporating with heat from the high pressure liquid from the one of said outdoor or indoor coils operating as a condenser, refrigerant liquid from the one of said indoor or outdoor coils operating as an evaporator;* the improvement comprising the provision of means including a subcooling control valve connecting said reheat coil to said [seventh] *sixth* tube between said expansion valve and said second check valve means, said subcooling control [means] valve having means including means responsive to the temperature and the pressure of the refrigerant condensed in said reheat coil for adjusting said subcooling control valve.

4. The invention claimed in claim 3 in which said expansion valve is a subcooling control valve having means including means responsive to the temperature and the pressure of the refrigerant condensed in said outdoor coil when the latter is operating as a condenser, and responsive to the temperature and the pressure of the refrigerant condensed within said indoor coil when said indoor coil is operating as a condenser.

References Cited

The following references, cited by the Examiner, are of record in the patented file of this patent or the original patent.

UNITED STATES PATENTS

| | | | |
|---|---|---|---|
| 2,952,987 | 9/1960 | Gould | 62—173 |
| 3,026,687 | 3/1962 | Robson | 62—173 |
| 3,264,840 | 8/1966 | Harnish | 62—173 |
| 3,316,730 | 5/1967 | Laver | 62—173 |
| 3,163,018 | 12/1964 | Shaw | 62—353 |
| 3,228,202 | 1/1966 | Cornelius | 62—320 X |
| 3,300,998 | 1/1967 | Jacobus et al. | 62—353 |

WILLIAM J. WYE, Primary Examiner

U.S. Cl. X.R.

62—160, 203